US010999316B2

(12) United States Patent
Raghunathan et al.

(10) Patent No.: US 10,999,316 B2
(45) Date of Patent: May 4, 2021

(54) CYBER RESILIENCY OF APPLICATION DATA

(71) Applicant: International Business Machines Corporation, Armonk, NY (US)

(72) Inventors: Ravi Kumar Raghunathan, Bengaluru (IN); Vinodraj Kuppusamy, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 16/415,098

(22) Filed: May 17, 2019

(65) Prior Publication Data

US 2020/0366708 A1 Nov. 19, 2020

(51) Int. Cl.
*H04L 29/06* (2006.01)
*G06F 3/06* (2006.01)

(52) U.S. Cl.
CPC .......... *H04L 63/1441* (2013.01); *G06F 3/061* (2013.01); *G06F 3/0655* (2013.01); *G06F 3/0673* (2013.01); *H04L 63/1416* (2013.01)

(58) Field of Classification Search
CPC ............. H04L 63/1441; H04L 63/1416; G06F 3/0655; G06F 3/0673; G06F 3/061;

(Continued)

(56) References Cited

U.S. PATENT DOCUMENTS 9,389,961 B1 7/2016 Patankar et al.
2015/0261955 A1* 9/2015 Huang .................. G06F 21/562
726/23

(Continued)

FOREIGN PATENT DOCUMENTS

CN CN108234482 A 6/2018

OTHER PUBLICATIONS

Clayton, "Cyber Resilience for Enterprise Data," Published Aug. 15, 2018, Updated Nov. 22, 2018, 4 pages. https://developer.ibm.com/storage/2018/08/15/cyber-resilience-enterprise-data/.

(Continued)

*Primary Examiner* — Beemnet W Dada
*Assistant Examiner* — Ka Shan Choy
(74) *Attorney, Agent, or Firm* — Yee & Associates, P.C.

(57) ABSTRACT

Cyber resiliency of application data is provided. An air gapped network is established for storing a point-in-time copy of application data corresponding to a workload running on a production infrastructure to decrease continuous network exposure of the point-in-time copy on a secondary infrastructure. A set of point-in-time copies is selected for testing the application data corresponding to the workload for validation on the secondary infrastructure. The set of point-in-time copies are validated on a periodic basis by applying cyberattack forensics, deep scanning, malware detection, and application level validation tests. An appropriate point-in-time copy is identified in the set of point-in-time copies to recover the application data corresponding to the workload. The application data corresponding to the workload are recovered to provide the cyber resiliency of the application data during cyberattack using the appropriate point-in-time copy.

17 Claims, 9 Drawing Sheets

(58) Field of Classification Search
CPC .............. G06F 11/1451; G06F 2201/84; G06F 11/1469; G06F 11/1458
See application file for complete search history.

(56) References Cited

U.S. PATENT DOCUMENTS

2017/0140156 A1* 5/2017 Gu .......................... G06F 21/566
2019/0356609 A1* 11/2019 Grunwald ........... G06F 11/2097

OTHER PUBLICATIONS

EMC Corporation, "Layered Data Protection Strategy Preserves Continuity of Vital Patient Services, Isolated recovery solution for today's healthcare digital environment," White Paper, Jul. 2016, 13 pages. https://www.emc.com/collateral/white-papers/h15240-layered-dp-strategy-patient-svcs-wp.pdf.

IBM Corporation, "IBM Resiliency Orchestration, Release Notes," Version 7.3, Printed Aug. 2018, 9 pages. https://www.ibm.com/support/knowledgecenter/SSBK5V_7.3.0/IBM%20Resiliency%20Orchestration%207.3%20Release%20Notes.pdf.

IBM Corporation, "IBM Resiliency Orchestration, Administrator's Guide," Version 7.3, Printed Oct. 2018, 539 pages. https://www.ibm.com/support/knowledgecenter/SSBK5V_7.3.2/IBM%20Resiliency%20Orchestration%207.3%20Admin%20Guide.pdf.

IBM Corporation, "IBM Resiliency Orchestration, Cyber Incident Recovery for Data with Actifio," Version 7.3, Printed Aug. 2018, 49 pages.

DELL EMC Corporation, "Recovering From a Destructive Cyber-Attack, " Leveraging Dell EMC Cyber Recovery to Recover the Lifeline of Your Business, Oct. 2017, 18 pages. https://www.emc.com/collateral/whitepaper/recovering-business-destructive-cyber-attack.pdf?isKoreaPage=false&domainUrlForCanonical=https%3A%2F%2Fwww.emc.com.

* cited by examiner

CYBER RESILIENCY OF APPLICATION DATA

STATEMENT REGARDING PRIOR DISCLOSURES BY THE INVENTOR OR A JOINT INVENTOR

The following disclosures are submitted under 35 U.S.C. § 102(b)(1)(A):

Ravi Raghunathan and Vinodraj Kuppusamy, "IBM Resiliency Orchestration, Release Notes," Version 7.3, made publicly available August 2018, 9 pages.

Ravi Raghunathan and Vinodraj Kuppusamy, "IBM Resiliency Orchestration, Cyber Incident Recovery for Data with Actifio," Version 7.3, made publicly available August 2018, 49 pages.

Ravi Raghunathan and Vinodraj Kuppusamy, "IBM Resiliency Orchestration, Administrators Guide," Version 7.3, made publicly available October, 539 pages.

BACKGROUND

1. Field

The disclosure relates generally to network security and more specifically to providing cyber resiliency of application data corresponding to a workload running on a production infrastructure.

2. Description of the Related Art

In computers and computer networks an attack is any attempt to expose, alter, disable, destroy, steal, or gain unauthorized access to or make unauthorized use of a network resource, such as data, documents, software, hardware, and the like. A cyberattack is any type of offensive tactic or strategy that targets computer systems, infrastructures, networks, or personal computing devices. An attacker may be a person or program that attempts to access data, functions, or other restricted areas of a computer system or network without authorization. In addition, a cyberattack may originate from an anonymous source.

A cyberattack may gain access a target resource by hacking into a vulnerable system. Cyberattacks can range from installing spyware on a personal computer to attempting to destroy an infrastructure of an entire entity, such as an enterprise, organization, agency, institution, and the like. Further, cyberattacks have become increasingly sophisticated and malicious.

Cyber resilience refers to an entity's ability to continuously deliver an intended outcome despite adverse cyber events. An objective of cyber resilience is to maintain the entity's ability to deliver the intended outcome continuously at all times. This means even when regular delivery mechanisms have failed, such as during an attack causing a security breach. Cyber resilience also includes the ability to restore delivery mechanisms after such events, as well as the ability to continuously change or modify delivery mechanisms if needed in the face of new risks. Backups and disaster recovery operations are part of the process of restoring delivery mechanisms.

SUMMARY

According to one illustrative embodiment, a computer-implemented method for providing cyber resiliency of application data is provided. A computer establishes an air gapped network for storing a point-in-time copy of application data corresponding to a workload running on a production infrastructure to decrease continuous network exposure of the point-in-time copy on a secondary infrastructure by only allowing access to the point-in-time copy when needed. The computer selects a set of point-in-time copies for testing the application data corresponding to the workload for validation on the secondary infrastructure without impacting the workload running on the production infrastructure. The computer validates the set of point-in-time copies on the secondary infrastructure on a periodic basis by applying cyberattack forensics, deep scanning, malware detection, and application level validation tests. The computer identifies an appropriate point-in-time copy in the set of point-in-time copies to recover the application data corresponding to the workload in a clean room contained in a locked down network of the secondary infrastructure. The computer recovers the application data corresponding to the workload in the clean room to provide the cyber resiliency of the application data during cyberattack using the appropriate point-in-time copy. According to other illustrative embodiments, a computer system and computer program product for providing cyber resiliency of application data are provided.

DETAILED DESCRIPTION

Figure 1:
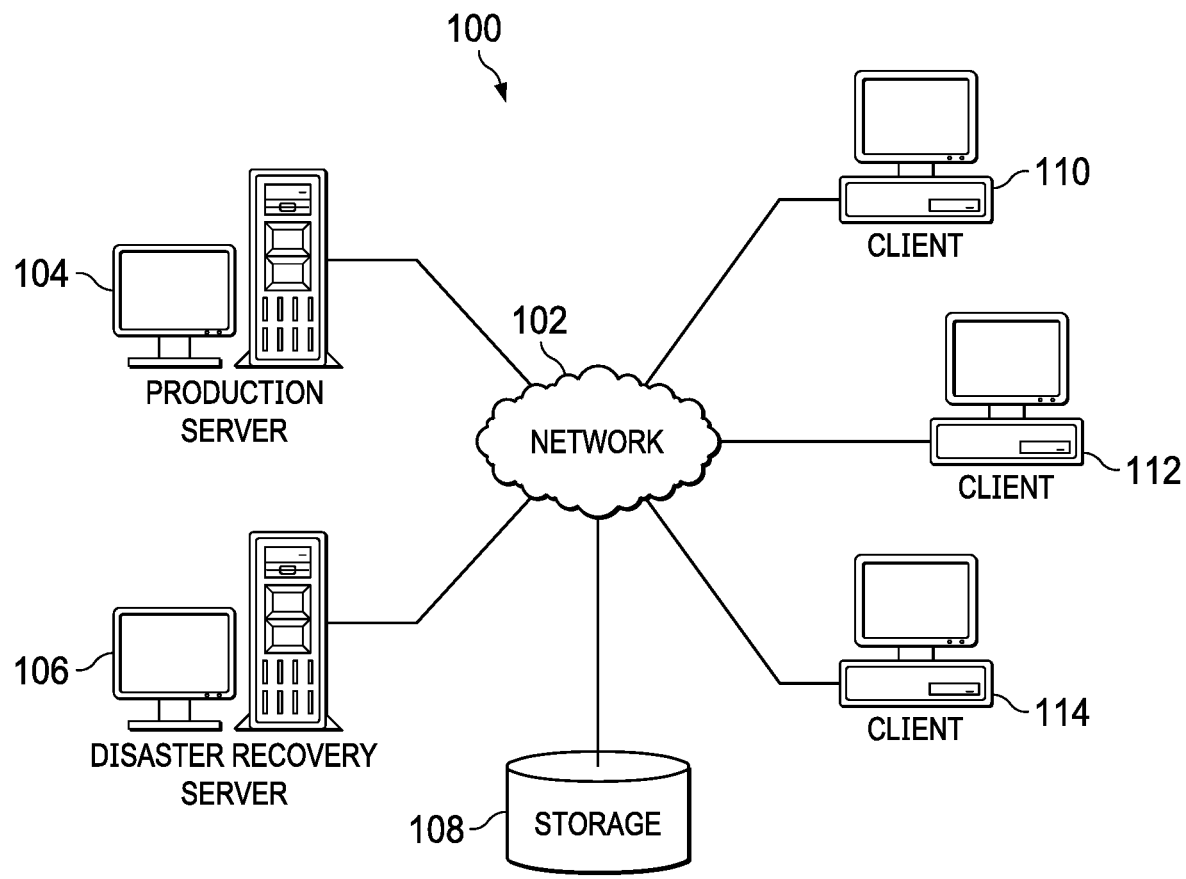
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
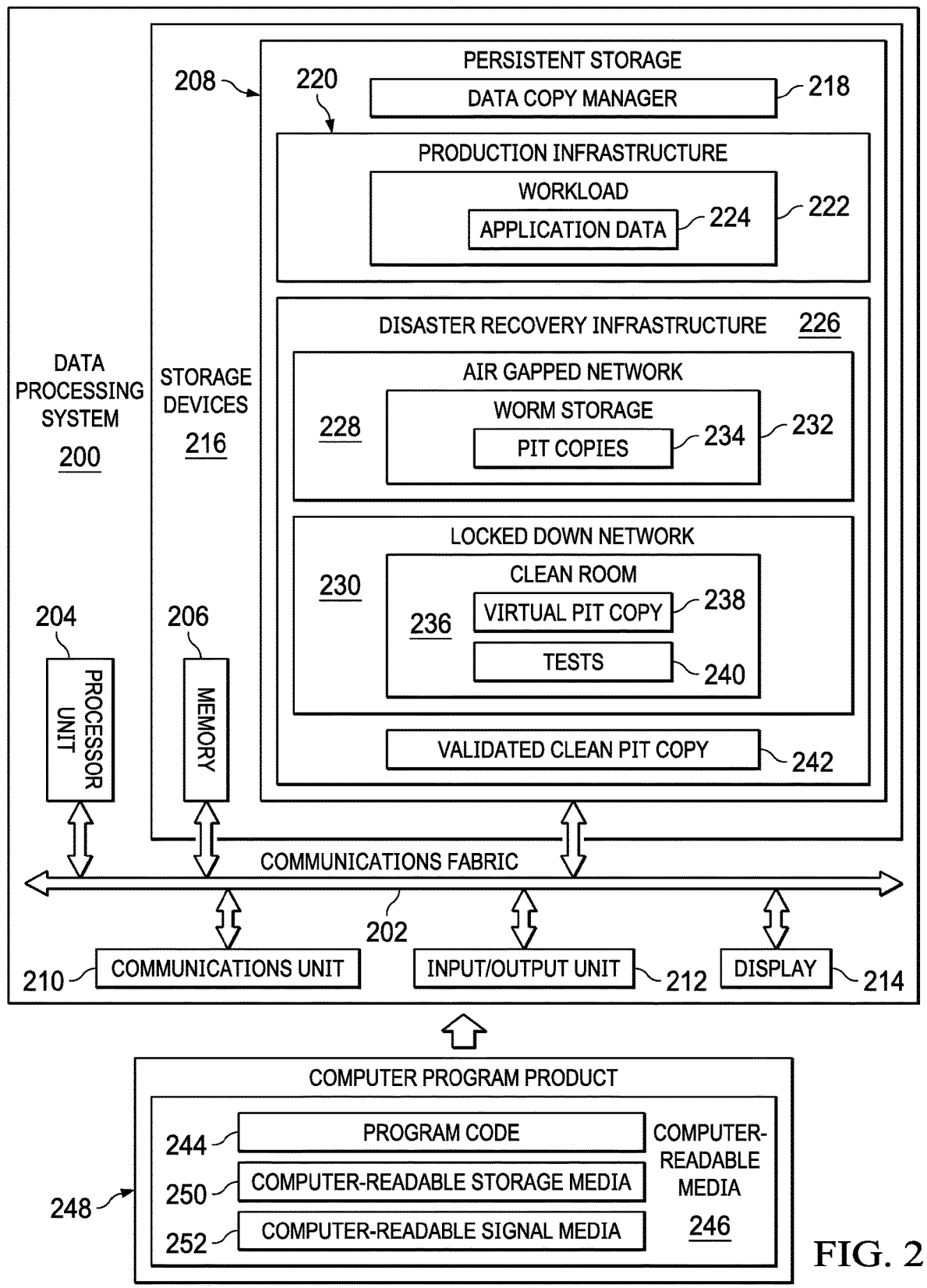
FIG. 2 is a diagram of a data processing system in which illustrative embodiments may be implemented.
Figure 3:
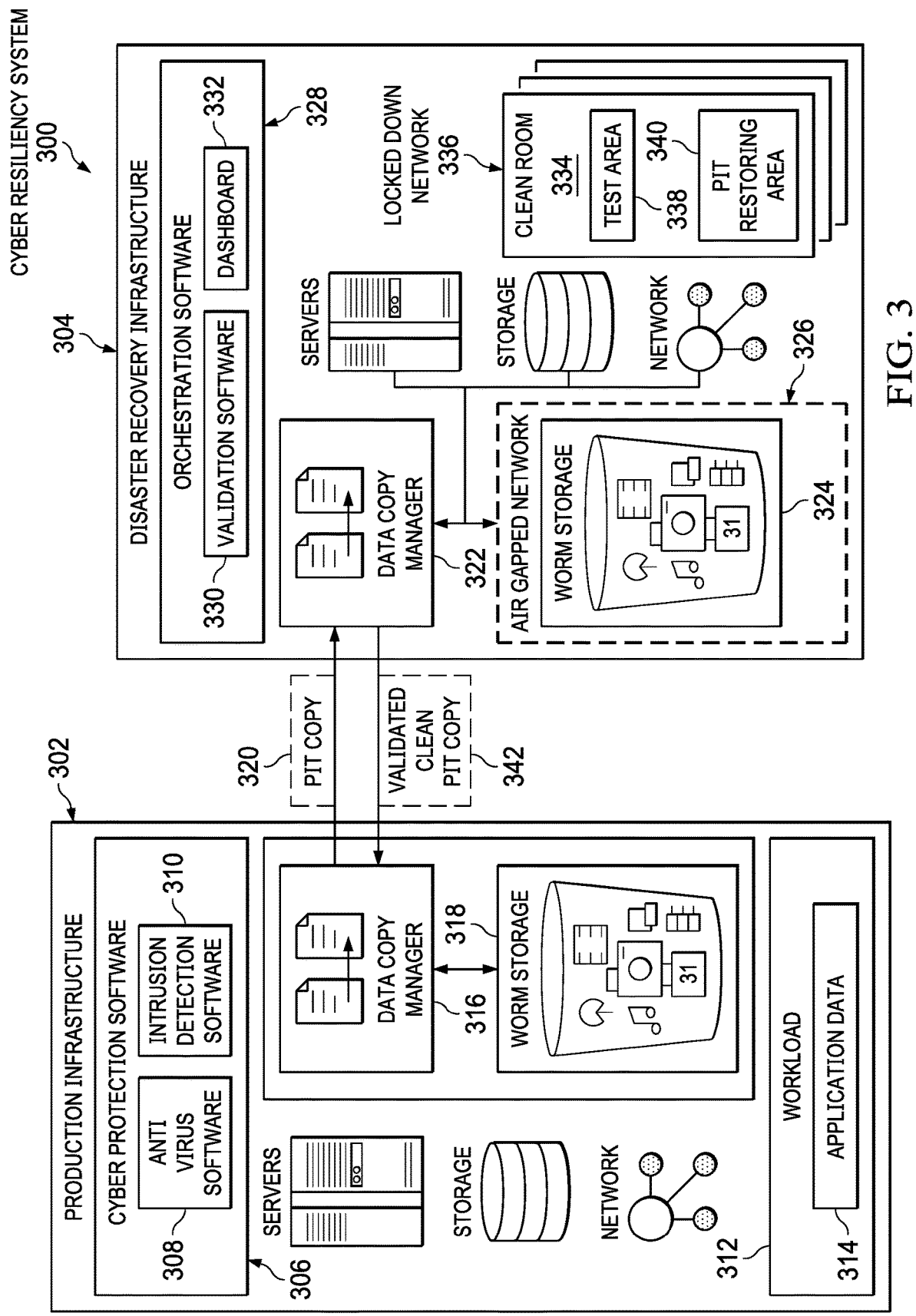
FIG. 3 is a diagram illustrating an example of a cyber resiliency system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, production server 104 and disaster recovery server 106 connect to network 102, along with storage 108. Production server 104 and disaster recovery server 106 may be, for example, server computers with high-speed connections to network 102. Also, it should be noted that production server 104 and disaster recovery server 106 may each represent a cluster of servers in one or more data centers. Alternatively, production server 104 and disaster recovery server 106 may each represent a plurality of computing nodes in one or more cloud environments.

In addition, production server 104 is part of a production infrastructure and provides a set of one or more services, such as, for example, event monitoring services, financial services, banking services, governmental services, educational services, reservation services, entertainment services, data services, and the like, to client device users. Further, production server 104 runs a workload using one or more virtual machines corresponding to the set of services. Furthermore, production server 104 backs up application data corresponding to the workload on a periodic basis by generating point-in-time copies of the application data to provide cyber resiliency of the application data during cyberattack. A point-in-time copy is a snapshot of the application data as the application data are at the time when the snapshot was taken. Production server 104 sends the point-in-time copies of the application data corresponding to the workload to disaster recovery server 106, which is part of a disaster recovery infrastructure.

Disaster recovery server 106 stores the received point-in-time copies of the application data corresponding to the workload running on production server 104 on a write only once read many (WORM) storage that is located in an air gapped network of the disaster recovery infrastructure. WORM storage is a data storage technology that allows the application data to be written to a disc drive a single time and prevents the disc drive from erasing or modifying the application data. In other words, once written to WORM storage, the application data are tamperproof or immutable. The air gapped network is an isolated network that is only accessible by disaster recovery server 106 when needed (e.g., to store or retrieve a point-in-time copy in the WORM storage). The air gapped network makes cyberattack on point-in-time copies of the application data corresponding to the workload very difficult.

On a periodic basis, disaster recovery server 106 may also validate that point-in-time copies are clean (i.e., free from cyberattack, malware, data breach, and the like) by testing the point-in-time copies in a clean room contained in a locked down network of the disaster recovery infrastructure. Alternatively, disaster recovery server 106 may validate point-in-time copies by testing the point-in-time copies in a non-clean room. The locked down network is another isolated network of the disaster recovery infrastructure that is only accessible by disaster recovery server 106 when validating point-in-time copies. Upon detection of a cyberattack on production server 104, disaster recovery server 106 sends a validated clean point-in-time copy to production server 104 for recovery and cyber resiliency during the cyberattack.

Client 110, client 112, and client 114 also connect to network 102. Clients 110, 112, and 114 are clients of production server 104. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like. Users of clients 110, 112, and 114 may utilize clients 110, 112, and 114 to access and utilize the services provided by production server 104. However, it should be noted that a user of a client device may use the client device to launch a cyberattack, such as, for example, malware injection, on production server 104.

Storage 108 is a network storage device capable of storing any type of data in a structured format or an unstructured format. In addition, storage 108 may represent a plurality of network storage devices. Further, storage 108 may store identifiers and network addresses for a plurality of production servers in a production infrastructure, identifiers for a plurality of different production workloads, identifiers and network addresses for a plurality of disaster recovery servers in a disaster recovery infrastructure, identifiers and network addresses for a plurality of different client devices, identifiers for a plurality of different users, and the like. Furthermore, storage 108 may store other types of data, such as authentication or credential data that may include user names, passwords, and biometric data associated with system administrators and security analysts, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on production server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as disaster recovery server 106 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data copy manager 218. However, it should be noted that even though data copy manager 218 is illustrated as residing in persistent storage 208, in an alternative illustrative embodiment data copy manager 218 may be a separate component of data processing system 200. For example, data copy manager 218 may be a hardware component coupled to communication fabric 202 or a combination of hardware and software components. In another alternative illustrative embodiment, a first set of components of data copy manager 218 may be located in data processing system 200 and a second set of components of data copy manager 218 may be located in a second data processing system, such as, for example, production server 104 in FIG. 1.

Data copy manager 218 controls the process for providing cyber resiliency of application data corresponding to a workload running on production infrastructure 220. Production infrastructure 220 represents an identifier of a production environment that provides a set of one or more services to users of client devices, such as, for example, users of clients 110, 112, and 114 in FIG. 1. Production infrastructure 220 comprises a plurality of hardware and software components that run workload 222, which generates application data 224, corresponding to the set of services.

Disaster recovery infrastructure 226 represents an identifier of a disaster recovery environment that provides disaster recovery services to production infrastructure 220. In addition, disaster recovery infrastructure 226 may represent a secondary infrastructure in a different location or data center or in the same location or data center as production infrastructure 220. Disaster recovery infrastructure 226 comprises a plurality of hardware and software components that provides the disaster recovery services. It should be noted that data processing system 200 is included in disaster recovery infrastructure 226.

In this example, disaster recovery infrastructure 226 includes air gapped network 228 and locked down network 230. Air gapped network 228 and locked down network 230 are isolated networks that are only accessed by data processing system 200 when needed. In other words, air gapped network 228 and locked down network 230 are not continuously network accessible, especially from remote devices (i.e., devices not included in disaster recovery infrastructure 226).

Air gapped network 228 contains WORM storage 232. WORM storage 232 is an immutable storage that contains point-in-time (PIT) copies 234. It should be noted that WORM storage 232 may represent a set of one or more WORM storage devices. PIT copies 234 represent a set of one or more PIT copies of application data 224 corresponding to workload 222. Data copy manager 218 receives PIT copies 234 from production infrastructure 220 on a periodic basis, such as, for example, thirty minutes, hour, six hours, twelve hours, day, three days, week, two weeks, month, or the like. Data copy manager 218 stores PIT copies 234 in WORM storage 232 as they are received.

Locked down network 230 contains clean room 236. Data copy manager 218 utilizes clean room 236 to periodically validate PIT copies 234 for cleanness. When validating a PIT copy, data copy manager 218 first generates a virtual read and writeable version of the PIT copy, such as virtual PIT copy 238. Then, data copy manager 218 executes workload 222 in clean room 236 using virtual PIT copy 238, which corresponds to application data 224 of workload 222. Further, data copy manager 218 runs tests 240 on virtual PIT copy 238 to determine compromise or vulnerability of virtual PIT copy 238. Tests 240 include, for example, one or more cyberattack forensics tests, deep scanning tests, malware detection tests, and application level validation tests. If data copy manager 218 determines that no compromise or vulnerability exists in virtual PIT copy 238, then data copy manager 218 marks virtual PIT copy 238 as clean to form validated clean PIT copy 242. Data copy manager 218 sends validated clean PIT copy 242 to production infrastructure 220 upon detection of a cyberattack for recovery and cyber resiliency of application data 224 of workload 222.

As a result, data processing system 200 operates as a special purpose computer system in which data copy manager 218 in data processing system 200 enables cyber resiliency of application data corresponding to a workload running in a production infrastructure. In particular, data copy manager 218 transforms data processing system 200 into a special purpose computer system as compared to currently available general computer systems that do not have data copy manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Cyberattacks and data breaches are on the rise. The impact of these cyberattacks and data breaches continues to escalate across industries and geographies. Cyberattacks and data breaches are a matter of "when" they will occur, not "if" they will occur. Cyber resiliency is an ability of an entity, such as an enterprise or organization, to continue to function with a least amount of disruption during a cyberattack. Cyber resiliency brings together "information security", "business continuity", and "network resilience" so that entities can function during cyberattacks and outages.

However, existing business continuity solutions have limitations and are not adequate to address cyberattacks. For example, these current approaches to business continuity involve copying the production data to a disaster recover server, datacenter, or site using backup technology or continuous data protection technology. Backup technology maintains one or more point-in-time copies on, for example, tapes, disks, or the like, based on backup schedule and retention period. During natural disaster or attack, an appropriate point-in-time backup copy is restored or recovered. Backup technology has high recovery point objectives and recovery time objectives. A recovery point objective is defined by business continuity planning and is the maximum targeted period in which data might be lost due to an incident or event. A recovery time objective is a targeted duration of time and service level within which a business process must be restored after disruption or disaster in order to avoid unacceptable consequences associated with a break in business continuity.

Continuous data protection (i.e., data replication) technology copies data changes as soon as possible so that the latest data are available in a disaster recovery infrastructure, usually on disk. During natural disaster or attack, the data available in the disaster recovery infrastructure is restored or recovered. Typically, the recovery time objective of continuous data protection technology is more efficient than the recovery time objective of backup technology.

However, during cyberattacks and data breaches, data is vulnerable because of continuous network exposure or because of targeted attacks on the disaster recovery infrastructure first. For example, because the production infrastructure and disaster recovery infrastructure are connected, continuous network exposure causes the attack (e.g., malware, such as viruses, ransomware, spyware, worms, and the like) to be propagated to the disaster recovery infrastructure from the production infrastructure. Thus, both the production data and the disaster recovery data are vulnerable and possibly compromised and useless. In addition, some malware has become intelligent enough to attack the disaster recovery data first and then the production data. Generally, there is no visibility into the quality of data in the disaster recovery infrastructure. As a result, during such attacks, entities are unaware that their production data and disaster recovery data are compromised. Consequently, these existing business continuity solutions described above are either ineffective against cyberattacks or are vulnerable to cyberattacks.

Another existing solution is to backup data to a tape library instead of disk. Since tapes are not always readily available (i.e., reachable via a network), this creates an air gap, which makes cyberattack extremely difficult. However, several drawbacks exist with this solution. For example, tapes are magnetic and can become damaged due to wear and tear. As a result, damaged tapes are useless during a recovery/restore operation. Further, rapid recovery is not possible because someone has to identify the appropriate tape for the recovery/restore operation, which is time consuming. Thus, critical applications and data cannot rely on tape backups for recovery, as tape backups may impact service level agreements. Furthermore, tapes are slower than disks and, therefore, backups to tape are not performed often enough as compared to the data change rate. As a result, data in a tape backup may be old or stale and may impact service level agreements. Moreover, validating a tape backup is tedious and time consuming.

Continuous data protection is designed to address the recovery time objective and the recovery point objective limitations of tape backups above. However, because the network exposure of continuous data protection technology is high (e.g., no air gap), the data in the disaster recovery infrastructure is usually vulnerable and compromised during cyberattacks. Although point-in-time snapshots of the data in the disaster recovery infrastructure can be created or supported, validating the data is not possible or is an external process.

Another existing solution is a vendor lock-in solution that can provide better recovery time objectives and recovery point objectives. However, vendor lock-in requires the use of vendor storage only. In other words, vendor lock-in means that the application needs to be migrated to a vendor storage platform to meet service level agreements.

Thus, no single existing solution provides effective cyber resiliency and disaster recovery. Consequently, entities have to use an array or set of software and hardware in a specific manner for complete cyber resiliency. For example, an entity may use a specific vendor product for disaster recovery, but also use tape backups to protect from cyberattacks by creating an air gap. However, combining existing solutions requires a lot of technical skill and manpower for day-to-day operation and during recovery.

Illustrative embodiments provide cyber resiliency solutions for business continuity to quickly remediate cyberattacks. For example, illustrative embodiments provide network isolation (i.e., an air gapped network) for storing data on a disaster recovery infrastructure. Thus, illustrative embodiments decrease continuous network exposure of disaster recovery data.

In addition, illustrative embodiments provide easy testing of data on the disaster recovery infrastructure without impacting the production infrastructure. Further, illustrative embodiments are capable of suggesting one or more suitable point-in-time copies to a user to test application data for compromise or vulnerability in a clean room that is located in an isolated, locked down network. Furthermore, illustrative embodiments provide fast identification of cyberattacks or data breaches on the disaster recovery infrastructure.

Moreover, illustrative embodiments provide an ability to periodically and automatically test and validate point-in-time copies stored on the disaster recovery infrastructure and report data compromise or vulnerabilities by using a combination of cyberattack forensics, deep scanning, malware detection, application level validations, and the like. In addition, illustrative embodiments provide rapid recovery of data stored on the disaster recovery infrastructure so that illustrative embodiments can recover critical applications according to their corresponding service level agreements. Illustrative embodiments also provide an ability to suggest a suitable point-in-time copy to a user to recover in the clean room, which is located in an isolated network or locked down network, in response to cyberattack.

Illustrative embodiments deploy a data copy manager on the local production infrastructure to perform backups of the application data. Illustrative embodiments may optionally deploy a write only once read many (WORM) storage on the production infrastructure and may optionally store point-in-time copies of the application data on the WORM storage in specific use cases. This process is not intrusive and does not need to change how an application is currently deployed.

Illustrative embodiments also deploy a data copy manager on the remote disaster recovery infrastructure. Further, illustrative embodiments deploy a WORM storage on the remote disaster recovery infrastructure. Furthermore, illustrative embodiments deploy orchestration software on the disaster recovery infrastructure. These deployments are in addition to the existing production infrastructure that the customer already has.

The WORM storage of the remote disaster recovery infrastructure is air gapped (i.e., network isolated to prevent unauthorized access to it). Moreover, illustrative embodiments may optionally deploy a set of one or more clean rooms on the disaster recovery or secondary infrastructure. Illustrative embodiments utilize the set of clean rooms, which are network-isolated locations free of software infection or breach, as additional resources to periodically and automatically test and validate whether application data are clean (e.g., without a malware infection, a cyberattack, or a data breach) and recoverable. It should be noted that illustrative embodiments may perform some or all testing and validation of applications in non-clean rooms as well.

Illustrative embodiments backup point-in-time copies from the local production infrastructure to the remote disaster recovery infrastructure. Optionally, illustrative embodiments may maintain some or all of the point-in-time copies on the WORM storage of the production infrastructure as well. Illustrative embodiments maintain the point-in-time copies on the immutable WORM storage of the disaster recovery infrastructure. Further, the WORM storage of the disaster recovery infrastructure is air-gapped (i.e., network isolated) so that the point-in-time copies are secure from data breach or cyberattack.

Using a clean room, illustrative embodiments periodically test and validate a set of one or more available point-in-time copies of application data to identify whether the application data are clean (e.g., free of malware infection, cyberattack, or data breach). Illustrative embodiments can detect cyberattack or data breach by utilizing existing cyber protection software on the production infrastructure or utilizing existing orchestration software in a clean room on the disaster recovery infrastructure. Upon detection of cyberattack or data breach, the orchestration software recovers or restores the application data on the remote disaster recovery infrastructure. The orchestration software recovers the application data from a set of one or more available point-in-time copies on the WORM storage. Preferably, the set of available point-in-time copies are from previously tested and validated point-in-time copies. Then, the data copy manager transfers the clean copy of the application data to the production infrastructure for increased performance during cyberattack or data breach.

Thus, illustrative embodiments provide cyber resiliency of production data generated by workloads by utilizing network isolation (i.e., an air gapped network) for storing production data on the disaster recovery infrastructure. Illustrative embodiments intelligently optimize continuous network exposure of disaster recovery data by allowing access to data on the disaster recovery infrastructure only when needed. Illustrative embodiments identify a point-in-time copy that is ideal for testing and verification of the data on the disaster recovery infrastructure without impacting production.

Illustrative embodiments may also recommend a set of one or more suitable point-in-time copies to a user to test a workload application for compliance in a clean room located in an isolated, locked down network. Further, illustrative embodiments perform automatic validation of point-in-time copies when the test procedure is changed or any new or previously received point-in-time copies are pending validation on the disaster recovery infrastructure. Furthermore, illustrative embodiments are able to periodically and automatically test and validate the point-in-time copies on the disaster recovery infrastructure and report compromise or vulnerabilities by using a combination of cyberattack forensics, deep scanning, malware or virus detection, application level validations, and the like. Moreover, illustrative embodiments identify an appropriate point-in-time copy for rapid recovery of data on the disaster recovery infrastructure and determine whether that point-in-time copy will meet service level agreement regarding recovery point objective and recovery time objective. In other words, illustrative embodiments provide an ability to recommend an appropriate point-in-time copy, which is located in a clean room of the disaster recovery infrastructure, to a user for recovery in case of cyberattack or data breach.

Thus, illustrative embodiments provide one or more technical solutions that overcome a technical problem with providing cyber resiliency of application data corresponding to a workload running on a production infrastructure during cyberattack. As a result, these one or more technical solutions provide a technical effect and practical application in the field of network security and cyber resiliency.

With reference now to FIG. 3, a diagram illustrating an example of a cyber resiliency system is depicted in accordance with an illustrative embodiment. Cyber resiliency system 300 may be implemented in a network of data processing systems, such as network data processing system 100 in FIG. 1. Cyber resiliency system 300 includes the hardware and software components for providing cyber resiliency of application data corresponding to a workload running on a production infrastructure during cyberattack or data breach.

In this example, cyber resiliency system 300 includes production infrastructure 302 and disaster recovery infrastructure 304. Production infrastructure 302 provides a set of one or more services to client device users and includes a plurality of components, such as, for example, servers, storage, and at least one network. Production infrastructure 302 also includes cyber protection software 306. Cyber protection software 306 protects or defends production infrastructure 302 from cyberattack. In this example, cyber protection software 306 includes antivirus software 308 and intrusion detection software 310.

Production infrastructure 302 runs workload 312. Workload 312 is comprised of virtual machines that provide the set of services to the client device users. Application data 314 corresponds to workload 312. Data copy manager 316 of production infrastructure 302 generates a point-in-time (PIT) copy of application data 314 corresponding to workload 312 and optionally stores the PIT copy in WORM storage 318 of production infrastructure 302. Data copy manager 316 sends the PIT copy of application data 314 corresponding to workload 312 (i.e., PIT copy 320) to data copy manager 322 of disaster recovery infrastructure 304.

Disaster recovery infrastructure 304 provides data recovery services to production infrastructure 302 and includes a plurality of components, such as, for example, servers, storage, and at least one network. Upon receiving PIT copy 320, data copy manager 322 stores PIT copy 320 in WORM storage 324 of disaster recovery infrastructure 304 by disabling air gapped network 326. WORM storage 324 is an immutable, tamperproof storage area. WORM storage 324 is included in air gapped network 326 to prevent cyberattack or data breach of PIT copies stored in WORM storage 324. Air gapped network 326 is an isolated network accessible by data copy manager 322 only when needed (i.e., to store or retrieve PIT copies). When finished accessing WORM storage 324, data copy manager 322 reenables air gapped network 326.

Disaster recovery infrastructure 304 also includes orchestration software 328. Orchestration software 328 coordinates and manages the components of disaster recovery infrastructure 304. In this example, orchestration software 328 includes validation software 330 and dashboard 332. Data copy manager 322 utilizes validation software 330 to validate or verify that PIT copies, such as PIT copy 320, are clean (e.g., free from cyberattack, malware, data breach, and the like). Users of disaster recovery infrastructure 304 may utilize dashboard 332 to, for example, confirm selection of PIT copies (e.g., either clean or unclean PIT copies) for recovery of application data 314 corresponding to workload 312.

When data copy manager 322 performs validation of PIT copy 320, data copy manager 322 first generates a virtual read and writeable version of PIT copy 320 and places the virtual read and writeable version of PIT copy 320 in clean room 334. Clean room 334 is located in locked down network 336 of disaster recovery infrastructure 304. Locked down network 336 is another isolated network accessible by data copy manager 322 only when needed (i.e., to test or restore PIT copies).

In this example, clean room 334 includes test area 338 and PIT copy restoring area 340. Data copy manager 322 utilizes test area 338 to execute workload 312 using the virtual read and writeable version of PIT copy 320. While executing workload 312 in test area 338, data copy manager 322 performs a combination of tests on the virtual read and writeable version of PIT copy 320 to detect compromise or vulnerability corresponding to cyberattack or data breach. The combination of tests may include, for example, one or more cyberattack forensics tests, deep scanning tests, malware detection tests, application level validation tests, and the like. If data copy manager 322 does not detect any compromise or vulnerability during testing, then data copy manager 322 marks PIT copy 320 as clean. If data copy manager 322 detects compromise or vulnerability during testing, then data copy manager 322 marks PIT copy 320 as unclean.

Upon detection of cyberattack or data breach by either cyber protection software 306 of production infrastructure 302 or orchestration software 328 of disaster recovery infrastructure 304, data copy manager 322 utilizes PIT restoring area 340 to prepare validated clean PIT copy 342 for sending to production infrastructure 302 to recover application data 314 of workload 312. Validated clean PIT copy 342 is PIT copy 320 previously marked as clean after validation testing.

Figure 4:
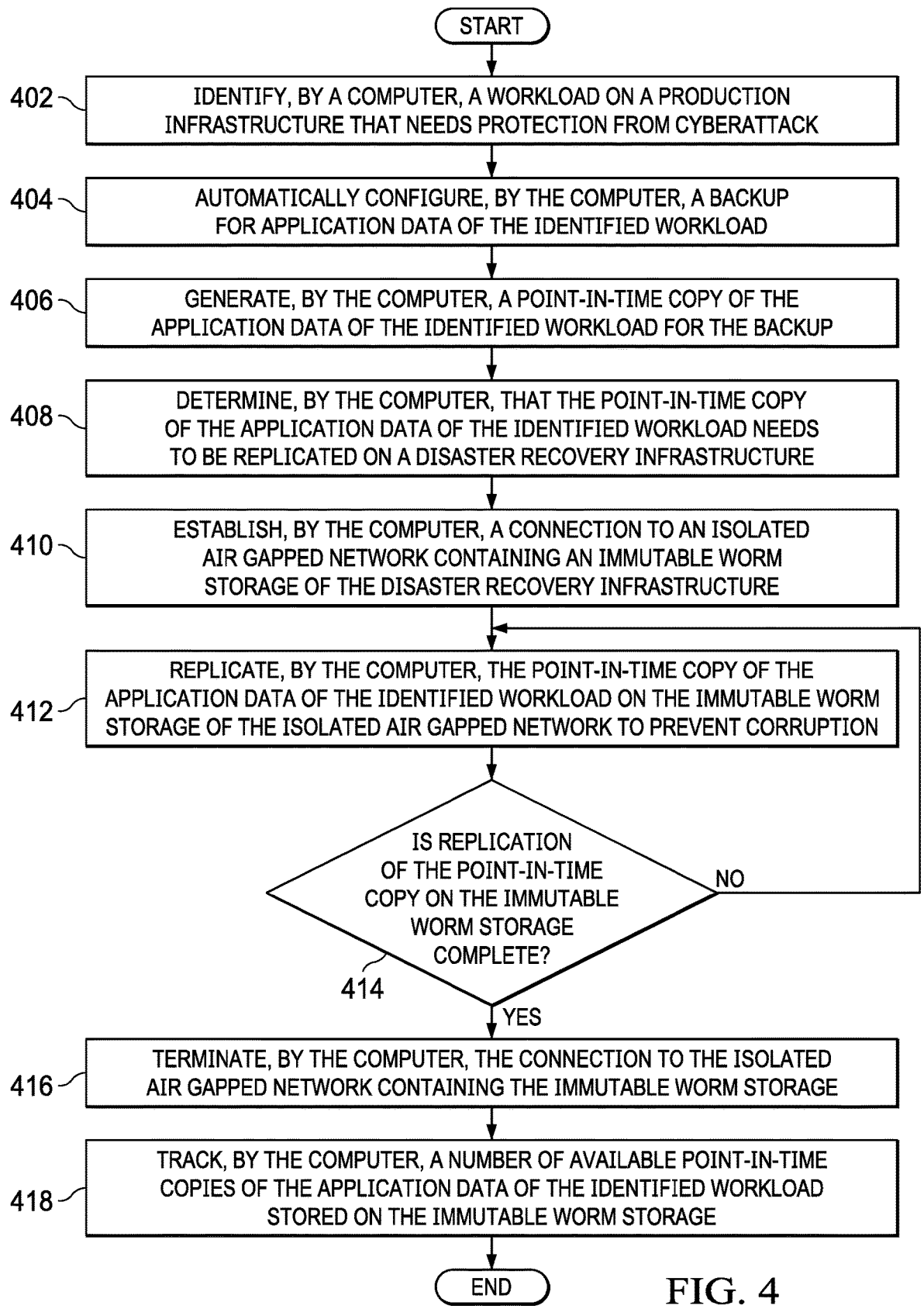
FIG. 4 is a flowchart illustrating a process for backing up application data in accordance with an illustrative embodiment.

With reference now to FIG. 4, a flowchart illustrating a process for backing up application data is shown in accordance with an illustrative embodiment. The process shown in FIG. 4 may be implemented in a computer, such as, for example, production server 104 in FIG. 1, which is included in a production infrastructure.

The process begins when the computer identifies a workload on the production infrastructure that needs protection from cyberattack (step 402). The computer automatically configures a backup for application data of the identified workload (step 404). Then, the computer generates a point-in-time copy of the application data of the identified workload for the backup (step 406).

In addition, the computer determines that the point-in-time copy of the application data of the identified workload needs to be replicated on a disaster recovery infrastructure (step 408). The computer may determine that the point-in-time copy of the application data needs to be replicated on, for example, a predetermined time interval basis or on user demand. The computer establishes a connection to an isolated air gapped network containing an immutable WORM storage of the disaster recovery infrastructure (step 410). It should be noted that the computer may select one of a plurality of WORM storage to use for storing the point-in-time copy. Further, the computer replicates the point-in-time copy of the application data of the identified workload on the immutable WORM storage of the isolated air gapped network to prevent corruption (step 412).

The computer makes a determination as to whether replication of the point-in-time copy on the immutable WORM storage is complete (step 414). If the computer determines that the replication of the point-in-time copy on the immutable WORM storage is not complete, no output of step 414, then the process returns to step 412 where the computer continues to replicate the point-in-time copy on the immutable WORM storage. If the computer determines that the replication of the point-in-time copy on the immutable WORM storage is complete, yes output of step 414, then the computer terminates the connection to the isolated air gapped network containing the immutable WORM storage (step 416). The computer also tracks a number of available point-in-time copies of the application data of the identified workload stored on the immutable WORM storage (step 418). Thereafter, the process terminates.

Figure 5A:
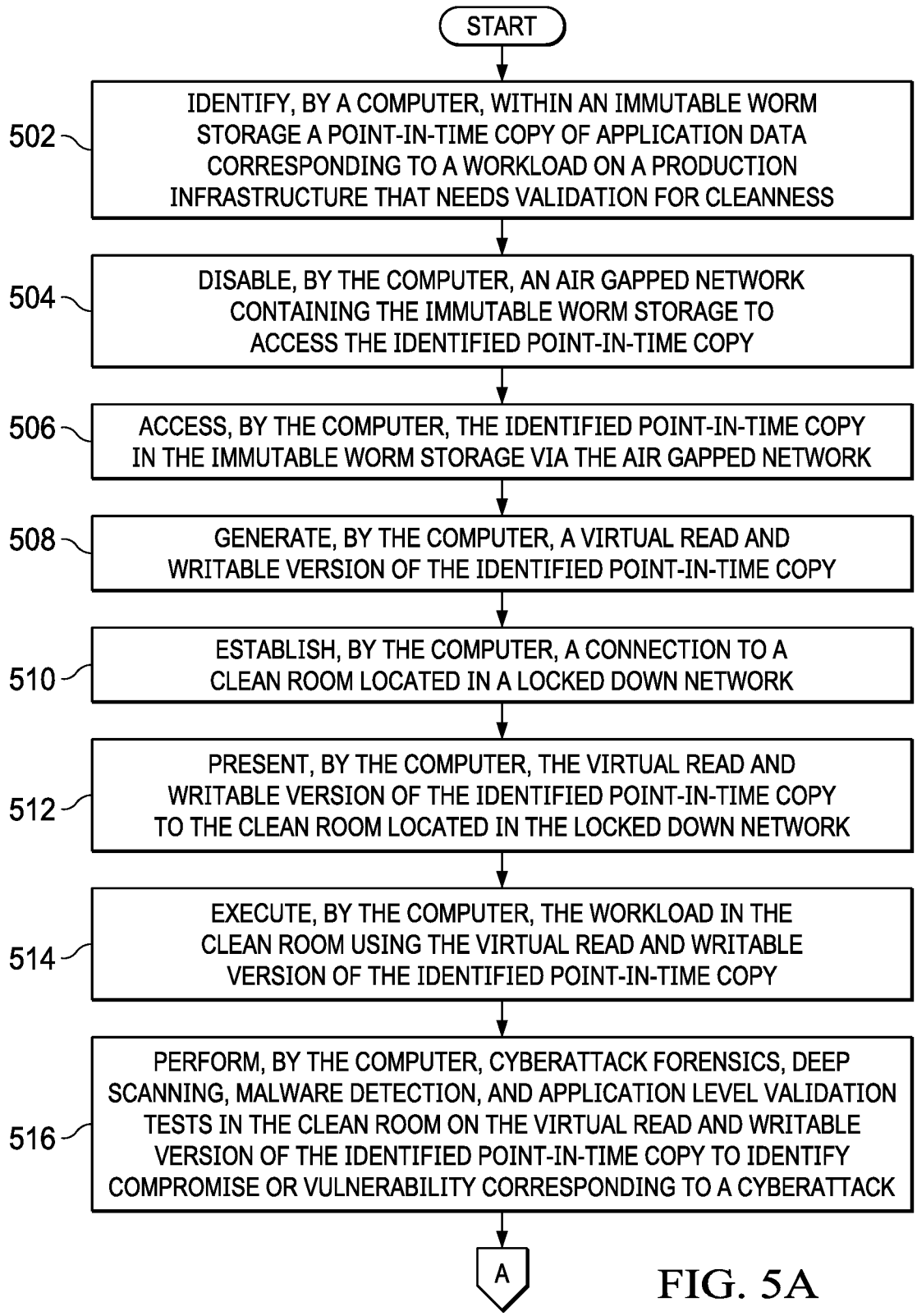
FIGS. 5A and 5B are a flowchart illustrating a process for validating point-in-time copies of application data in a clean room in accordance with an illustrative embodiment.
Figure 5B:
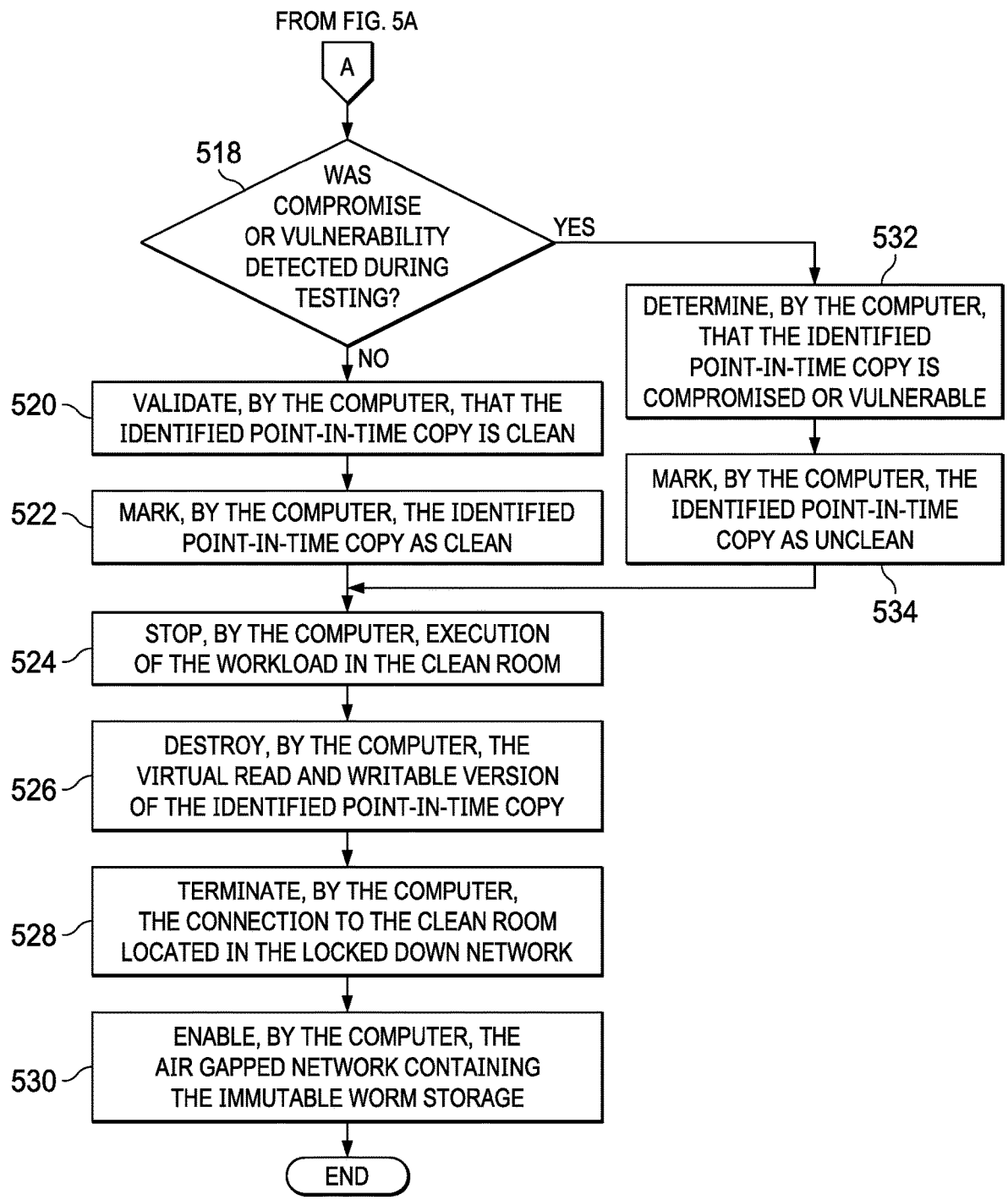

With reference now to FIGS. 5A and 5B, a flowchart illustrating a process for validating point-in-time copies of application data in a clean room is shown in accordance with an illustrative embodiment. The process shown in FIGS. 5A and 5B may be implemented in a computer, such as, for example, disaster recovery server 106 in FIG. 1 or data processing system 200 in FIG. 2, which is included in a disaster recovery infrastructure.

The process begins when the computer identifies, within an immutable WORM storage, a point-in-time copy of application data corresponding to a workload on a production infrastructure that needs validation for cleanness (step 502). The immutable WORM storage may be one of a plurality of immutable WORM storage included in an air gapped network of the disaster recovery infrastructure. The computer disables the air gapped network containing the immutable WORM storage to access the identified point-in-time copy (step 504).

The computer accesses the identified point-in-time copy in the immutable WORM storage via the air gapped network (step 506). The computer generates a virtual read and writable version of the identified point-in-time copy (step 508). In addition, the computer establishes a connection to a clean room located in a locked down network of the disaster recovery infrastructure (step 510).

The computer presents the virtual read and writable version of the identified point-in-time copy to the clean room located in the locked down network (step 512). The computer executes the workload in the clean room using the virtual read and writable version of the identified point-in-time copy (step 514). Further, the computer performs cyberattack forensics, deep scanning, malware detection, and application level validation tests in the clean room on the virtual read and writable version of the identified point-in-time copy to identify compromise or vulnerability corresponding to a cyberattack (step 516).

The computer makes a determination as to whether compromise or vulnerability was detected during testing on the virtual read and writable version of the identified point-in-time copy (step 518). If computer determines that compromise or vulnerability was not detected during testing on the virtual read and writable version of the identified point-in-time copy, no output of step 518, then the computer validates that the identified point-in-time copy is clean (step 520). The computer also marks the identified point-in-time copy as clean (step 522).

Afterward, the computer stops execution of the workload in the clean room (step 524). Furthermore, the computer destroys the virtual read and writable version of the identified point-in-time copy (step 526). Moreover, the computer terminates the connection to the clean room located in the locked down network (step 528). In addition, the computer enables the air gapped network containing the immutable worm storage (step 530). Thereafter, the process terminates.

Returning again to step 518, if the computer determines that compromise or vulnerability was detected during testing on the virtual read and writable version of the identified point-in-time copy, yes output of step 518, then the computer determines that the identified point-in-time copy is compromised or vulnerable (step 532). In addition, the computer marks the identified point-in-time copy as unclean (step 534). Thereafter, the process returns to step 524 where the computer stops execution of the workload in the clean room.

Figure 6A:
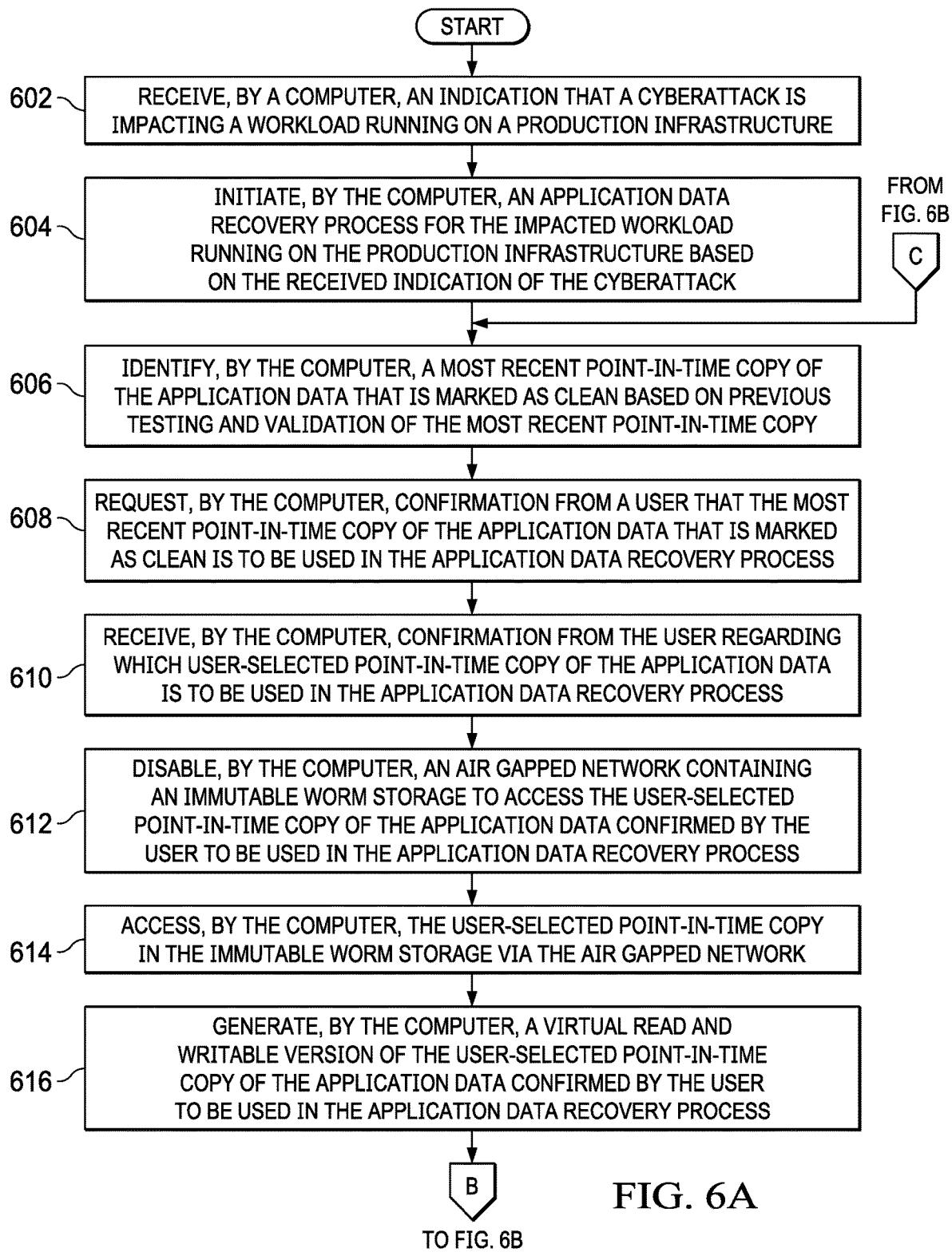
FIGS. 6A and 6B are a flowchart illustrating a process for recovering application data during a cyberattack in accordance with an illustrative embodiment.
Figure 6B:
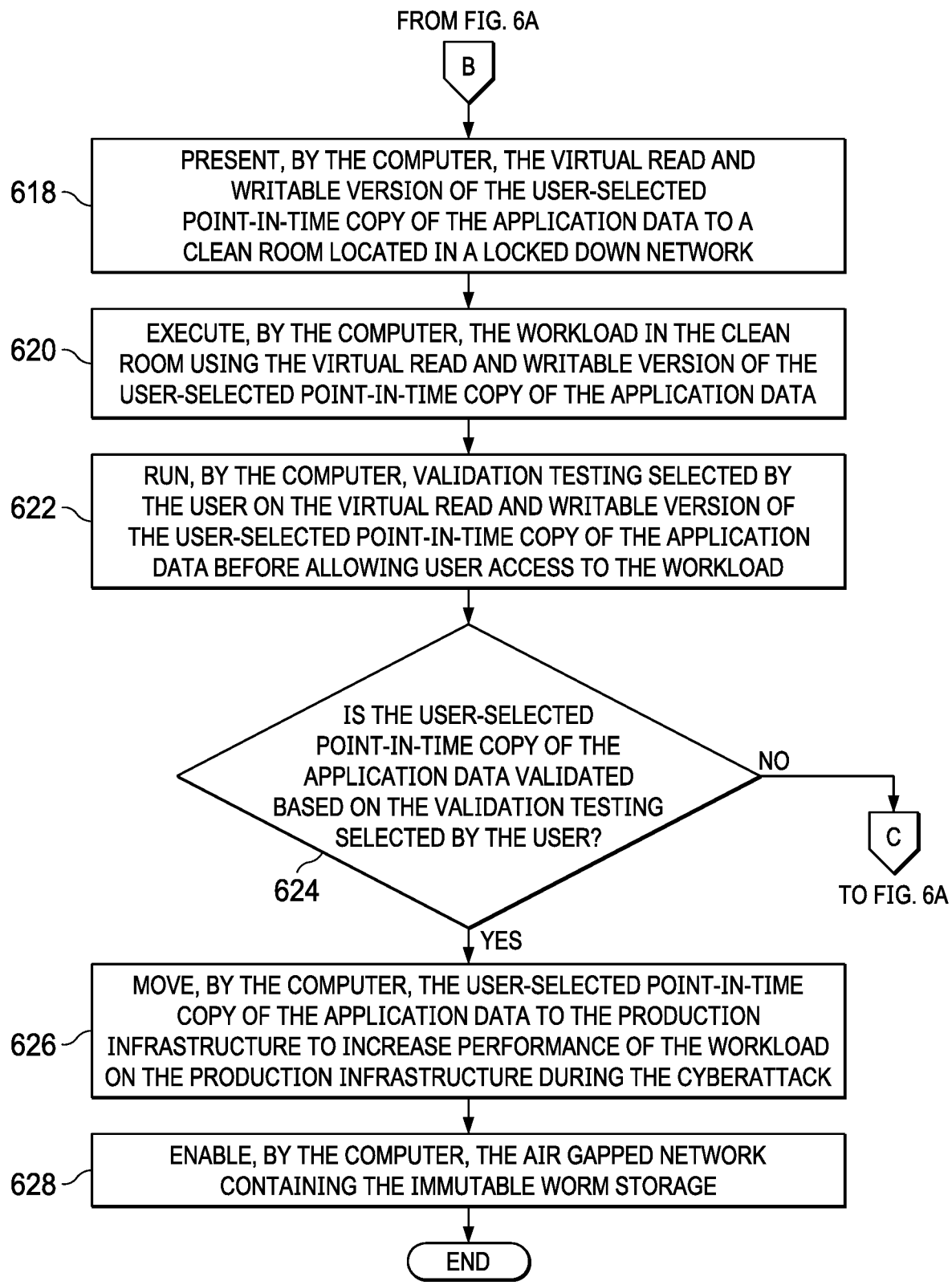

With reference now to FIGS. 6A and 6B, a flowchart illustrating a process for recovering application data during a cyberattack is shown in accordance with an illustrative embodiment. The process shown in FIGS. 6A and 6B may be implemented in a computer, such as, for example, disaster recovery server 106 in FIG. 1 or data processing system 200 in FIG. 2, which is included in a disaster recovery infrastructure.

The process begins when the computer receives an indication that a cyberattack is impacting a workload running on a production infrastructure (step 602). The computer initiates an application data recovery process for the impacted workload running on the production infrastructure based on the received indication of the cyberattack (step 604). In addition, the computer identifies a most recent point-in-time copy of the application data that is marked as clean based on previous testing and validation of the most recent point-in-time copy (step 606).

Further, the computer requests confirmation from a user that the most recent point-in-time copy of the application data that is marked as clean is to be used in the application data recovery process (step 608). Subsequently, the computer receives confirmation from the user regarding which user-selected point-in-time copy of the application data is to be used in the application data recovery process (step 610). It should be noted that the user may select any point-in-time copy. For example, the user may select a clean point-in-time copy or an unclean point-in-time copy from the production infrastructure or from the disaster recovery infrastructure.

The computer disables an air gapped network containing an immutable WORM storage to access the user-selected point-in-time copy of the application data confirmed by the user to be used in the application data recovery process (step 612). The computer accesses the user-selected point-in-time copy in the immutable worm storage via the air gapped network (step 614). Afterward, the computer generates a virtual read and writable version of the user-selected point-in-time copy of the application data confirmed by the user to be used in the application data recovery process (step 616).

The computer presents the virtual read and writable version of the user-selected point-in-time copy of the application data to a clean room located in a locked down network of the disaster recovery infrastructure (step 618). Alternatively, the computer may present the virtual read and writable version of the user-selected point-in-time copy of the application data to a non-clean room. The computer executes the workload in the clean room using the virtual read and writable version of the user-selected point-in-time copy of the application data (step 620). Furthermore, the computer runs validation testing selected by the user on the virtual read and writable version of the user-selected point-in-time copy of the application data before allowing user access to the workload (step 622).

The computer makes a determination as to whether the user-selected point-in-time copy of the application data is validated based on the validation testing selected by the user (step 624). If the computer determines that the user-selected point-in-time copy of the application data is not validated based on the validation testing selected by the user, no output of step 624, then the process returns to step 606 where the computer identifies another point-in-time copy of the application data marked as clean. If the computer determines that the user-selected point-in-time copy of the application data is validated based on the validation testing selected by the user, yes output of step 624, then the computer moves the user-selected point-in-time copy of the application data to the production infrastructure to increase performance of the workload on the production infrastructure during the cyberattack (step 626). The computer also enables the air gapped network containing the immutable worm storage (step 628). Thereafter, the process terminates.

Figure 7:
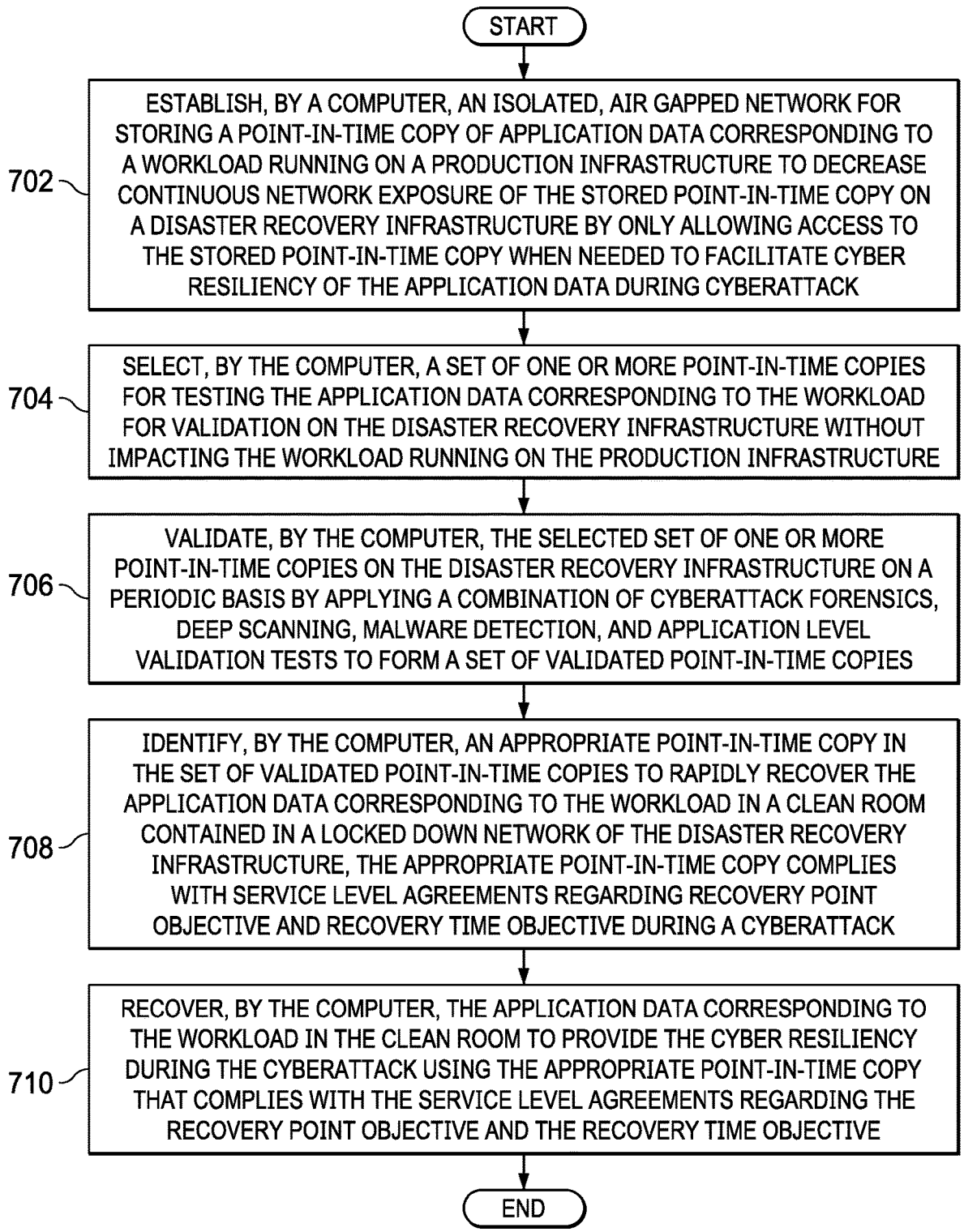
FIG. 7 is a flowchart illustrating a process for providing cyber resiliency of application data in accordance with an illustrative embodiment.

With reference now to FIG. 7, a flowchart illustrating a process for providing cyber resiliency of application data is shown in accordance with an illustrative embodiment. The process shown in FIG. 7 may be implemented in a computer, such as, for example, disaster recovery server 106 in FIG. 1 or data processing system 200 in FIG. 2, which is included in a disaster recovery infrastructure.

The process begins when the computer establishes an isolated, air gapped network for storing a point-in-time copy of application data corresponding to a workload running on a production infrastructure to decrease continuous network exposure of the stored point-in-time copy on the disaster recovery infrastructure by only allowing access to the stored point-in-time copy when needed to facilitate cyber resiliency of the application data during cyberattack (step 702). It should be noted that the disaster recovery infrastructure may be a secondary infrastructure in the same location or data center as the production infrastructure or in a different location or data center. In addition, the computer selects a set of one or more point-in-time copies for testing the application data corresponding to the workload for validation on the disaster recovery infrastructure without impacting the workload running on the production infrastructure (step 704).

The computer validates the selected set of one or more point-in-time copies on the disaster recovery infrastructure on a periodic basis by applying a combination of cyberattack forensics, deep scanning, malware detection, and application level validation tests to form a set of validated point-in-time copies (step 706). Further, the computer identifies an appropriate point-in-time copy in the set of validated point-in-time copies to rapidly recover the application data corresponding to the workload in a clean room contained in a locked down network of the disaster recovery infrastructure (step 708). The appropriate point-in-time copy complies with service level agreements regarding recovery point objective and recovery time objective during a cyberattack.

The computer recovers the application data corresponding to the workload in the clean room to provide the cyber resiliency during the cyberattack using the appropriate point-in-time copy that complies with the service level agreements regarding the recovery point objective and the recovery time objective (step 710). Thereafter, the process terminates.

Thus, illustrative embodiments of the present invention provide a computer-implemented method, computer system, and computer program product for providing cyber resiliency of application data corresponding to a workload running on a production infrastructure. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing cyber resiliency of application data, the computer-implemented method comprising:
    establishing, by a computer, an air gapped network for storing a point-in-time copy of application data corresponding to a workload running on a production infrastructure to decrease continuous network exposure of the point-in-time copy on a secondary infrastructure by only allowing access to the point-in-time copy when needed;
    selecting, by the computer, a set of point-in-time copies for testing the application data corresponding to the workload for validation on the secondary infrastructure without impacting the workload running on the production infrastructure;
    validating, by the computer, the set of point-in-time copies on the secondary infrastructure on a periodic basis by applying cyberattack forensics, deep scanning, malware detection, and application level validation tests;
    identifying, by the computer, an appropriate point-in-time copy in the set of point-in-time copies to recover the application data corresponding to the workload in a clean room contained in a locked down network of the secondary infrastructure, wherein the appropriate point-in-time copy complies with service level agreements regarding recovery point objective and recovery time objective during the cyberattack; and recovering, by the computer, the application data corresponding to the workload in the clean room to provide the cyber resiliency of the application data during cyberattack using the appropriate point-in-time copy.

2. The computer-implemented method of claim 1 further comprising:

identifying, by the computer, within a write once read many storage a particular point-in-time copy of the application data corresponding to the workload on the production infrastructure that needs validation for cleanness, wherein the write once read many storage is included in the secondary infrastructure;

disabling, by the computer, the air gapped network containing the write once read many storage to access the particular point-in-time copy;

accessing, by the computer, the particular point-in-time copy in the write once read many storage via the air gapped network; and generating, by the computer, a virtual version of the particular point-in-time copy.

3. The computer-implemented method of claim 2 further comprising:

establishing, by the computer, a connection to a clean room located in a locked down network of the secondary infrastructure; and presenting, by the computer, the virtual version of the particular point-in-time copy to the clean room located in the locked down network.

4. The computer-implemented method of claim 3 further comprising:

executing, by the computer, the workload in the clean room using the virtual version of the particular point-in-time copy;

performing, by the computer, cyberattack forensics, deep scanning, malware detection, and application level validation tests in the clean room on the virtual version of the particular point-in-time copy to identify compromise or vulnerability corresponding to the cyberattack; and determining, by the computer, whether compromise or vulnerability was detected during testing on the virtual version of the particular point-in-time copy.

5. The computer-implemented method of claim 4 further comprising:

responsive to the computer determining that compromise or vulnerability was not detected during the testing on the virtual version of the particular point-in-time copy, validating, by the computer, that the particular point-in-time copy is clean;

marking, by the computer, the particular point-in-time copy as clean; and stopping, by the computer, execution of the workload in the clean room.

6. The computer-implemented method of claim 4 further comprising:

responsive to the computer determining that compromise or vulnerability was detected during the testing on the virtual version of the particular point-in-time copy, determining, by the computer, that the particular point-in-time copy is compromised or vulnerable; and marking, by the computer, the particular point-in-time copy as unclean.

7. The computer-implemented method of claim 4 further comprising:

destroying, by the computer, the virtual version of the particular point-in-time copy;

terminating, by the computer, the connection to the clean room located in the locked down network; and enabling, by the computer, the air gapped network containing the write once read many storage.

8. The computer-implemented method of claim 4, wherein the virtual version of the particular point-in-time copy is a virtual read and writable version of the particular point-in-time copy.

9. The computer-implemented method of claim 1 further comprising:

receiving, by the computer, an indication that the cyberattack is impacting the workload running on the production infrastructure; and initiating, by the computer, an application data recovery process for the workload running on the production infrastructure based on the received indication of the cyberattack.

10. The computer-implemented method of claim 9 further comprising:

identifying, by the computer, a most recent point-in-time copy of the application data that is marked as clean based on previous testing and validation of the most recent point-in-time copy;

requesting, by the computer, confirmation from a user that the most recent point-in-time copy of the application data that is marked as clean is to be used in the application data recovery process; and receiving, by the computer, confirmation from the user regarding which user-selected point-in-time copy of the application data is to be used in the application data recovery process.

11. The computer-implemented method of claim 10 further comprising:

determining, by the computer, whether the user-selected point-in-time copy of the application data is validated based on validation testing selected by the user;

responsive to the computer determining that the user-selected point-in-time copy of the application data is validated based on the validation testing selected by the user, moving, by the computer, the user-selected point-in-time copy of the application data to the production infrastructure to increase performance of the workload on the production infrastructure during the cyberattack.

12. A computer system for providing cyber resiliency of application data, the computer system comprising:

a bus system;

a storage device connected to the bus system, wherein the storage device stores program instructions; and a processor connected to the bus system, wherein the processor executes the program instructions to:

establish an air gapped network for storing a point-in-time copy of application data corresponding to a workload running on a production infrastructure to decrease continuous network exposure of the point-in-time copy on a secondary infrastructure by only allowing access to the point-in-time copy when needed;

select a set of point-in-time copies for testing the application data corresponding to the workload for validation on the secondary infrastructure without impacting the workload running on the production infrastructure;

validate the set of point-in-time copies on the secondary infrastructure on a periodic basis by applying cyberattack forensics, deep scanning, malware detection, and application level validation tests;

identify an appropriate point-in-time copy in the set of point-in-time copies to recover the application data corresponding to the workload in a clean room contained in a locked down network of the secondary infrastructure, wherein the appropriate point-in-time copy complies with service level agreements regarding recovery point objective and recovery time objective during the cyberattack; and recover the application data corresponding to the workload in the clean room to provide the cyber resiliency of the application data during cyberattack using the appropriate point-in-time copy.

13. A computer program product for providing cyber resiliency of application data, the computer program product comprising a computer readable storage medium having program instructions embodied therewith, the program instructions executable by a computer to cause the computer to perform a method comprising:

establishing, by the computer, an air gapped network for storing a point-in-time copy of application data corresponding to a workload running on a production infrastructure to decrease continuous network exposure of the point-in-time copy on a secondary infrastructure by only allowing access to the point-in-time copy when needed;

selecting, by the computer, a set of point-in-time copies for testing the application data corresponding to the workload for validation on the secondary infrastructure without impacting the workload running on the production infrastructure;

validating, by the computer, the set of point-in-time copies on the secondary infrastructure on a periodic basis by applying cyberattack forensics, deep scanning, malware detection, and application level validation tests;

identifying, by the computer, an appropriate point-in-time copy in the set of point-in-time copies to recover the application data corresponding to the workload in a clean room contained in a locked down network of the secondary infrastructure, wherein the appropriate point-in-time copy complies with service level agreements regarding recovery point objective and recovery time objective during the cyberattack; and recovering, by the computer, the application data corresponding to the workload in the clean room to provide the cyber resiliency of the application data during cyberattack using the appropriate point-in-time copy.

14. The computer program product of claim 13 further comprising:

identifying, by the computer, within a write once read many storage a particular point-in-time copy of the application data corresponding to the workload on the production infrastructure that needs validation for cleanness, wherein the write once read many storage is included in the secondary infrastructure;

disabling, by the computer, the air gapped network containing the write once read many storage to access the particular point-in-time copy;

accessing, by the computer, the particular point-in-time copy in the write once read many storage via the air gapped network; and generating, by the computer, a virtual version of the particular point-in-time copy.

15. The computer program product of claim 14 further comprising:

establishing, by the computer, a connection to a clean room located in a locked down network of the secondary infrastructure; and presenting, by the computer, the virtual version of the particular point-in-time copy to the clean room located in the locked down network.

16. The computer program product of claim 15 further comprising:

executing, by the computer, the workload in the clean room using the virtual version of the particular point-in-time copy;

performing, by the computer, cyberattack forensics, deep scanning, malware detection, and application level validation tests in the clean room on the virtual version of the particular point-in-time copy to identify compromise or vulnerability corresponding to the cyberattack; and determining, by the computer, whether compromise or vulnerability was detected during testing on the virtual version of the particular point-in-time copy.

17. The computer program product of claim 16 further comprising:

responsive to the computer determining that compromise or vulnerability was not detected during the testing on the virtual version of the particular point-in-time copy, validating, by the computer, that the particular point-in-time copy is clean;

marking, by the computer, the particular point-in-time copy as clean; and stopping, by the computer, execution of the workload in the clean room.

* * * * *